United States Patent [19]

Venkatesan

[11] Patent Number: 4,523,642

[45] Date of Patent: Jun. 18, 1985

[54] OIL RECOVERY PROCESS EMPLOYING $CO_2$ PRODUCED IN SITU

[75] Inventor: Valadi N. Venkatesan, Arlington, Tex.

[73] Assignee: Mobil Oil Corporation, New York, N.Y.

[21] Appl. No.: 598,137

[22] Filed: Apr. 9, 1984

[51] Int. Cl.³ .................... E21B 43/22; E21B 43/24
[52] U.S. Cl. .................... 166/272; 166/270; 166/300
[58] Field of Search ............. 166/272, 273, 303, 300, 166/270

[56] References Cited

U.S. PATENT DOCUMENTS

| | | | |
|---|---|---|---|
| 2,813,583 | 11/1957 | Marx et al. | 166/11 |
| 3,036,632 | 5/1962 | Koch et al. | 166/11 |
| 3,221,813 | 8/1963 | Closmann et al. | 166/11 |
| 3,457,996 | 7/1969 | Parker | 166/300 |
| 3,731,741 | 5/1973 | Palmer et al. | 166/272 |
| 3,853,178 | 12/1974 | Shen | 166/272 |
| 3,871,452 | 3/1975 | Sarem | 166/270 |
| 3,880,237 | 4/1975 | Snavely, Jr. et al. | 166/303 |
| 4,068,716 | 1/1978 | Allen | 166/271 |
| 4,156,462 | 5/1979 | Allen | 166/270 |
| 4,441,555 | 4/1984 | Shu | 166/272 |

*Primary Examiner*—Stephen J. Novosad
*Assistant Examiner*—Bruce M. Kisliuk
*Attorney, Agent, or Firm*—Alexander J. McKillop; Michael G. Gilman; Stanislaus Aksman

[57] ABSTRACT

Recovery of oil from an oil-containing formation is effected by injection of steam followed by a soak period, if desired, and then injecting a mixture of sodium bicarbonate and citric acid that react in the formation to form carbon dioxide in situ. A driving fluid, preferably hot water or low quality steam (less than 20%), is then injected to displace the carbon dioxide and oil toward a production well for recovery. The process may be operated under conditions wherein the carbon dioxide formed in situ is miscible with the formation oil at the pressure and temperature of the formation thereby effecting miscible displacement and enhancing oil recovery.

15 Claims, No Drawings

12# OIL RECOVERY PROCESS EMPLOYING CO₂ PRODUCED IN SITU

FIELD OF THE INVENTION

This invention relates to a process for recovering oil from a subterranean, viscous oil-containing formation. More particularly, this invention relates to a method of recovering oil wherein the oil is displaced from a formation by carbon dioxide which is developed within the formation.

BACKGROUND OF THE INVENTION

In the recovery of oil from oil-containing formations, it usually is possible to recover only minor portions of the original oil in-place by the so-called primary recovery methods which utilize only the natural forces present in the formation. Thus, a variety of supplemental recovery techniques have been employed in order to increase the recovery of oil from subterranean formations. These techniques include thermal recovery methods, waterflooding and miscible flooding.

More recently, carbon dioxide has been used successfully as a miscible oil recovery agent. Carbon dioxide is a particularly desirable material because it is highly soluble in oil, and dissolution of carbon dioxide in oil causes a reduction in the viscosity of the oil and increases the volume of oil, all of which improve the recovery efficiency of the process. Carbon dioxide is sometimes employed under non-miscible conditions, and in certain reservoirs it is possible to achieve a condition of miscibility at reservoir temperature and pressure between essentially pure carbon dioxide and the reservoir oil.

The present invention provides a method for recovering oil from subterranean, oil-containing formations wherein a slug of carbon dioxide is established in situ by injecting a slug of steam followed by injecting sodium bicarbonate and citric acid that reacts under formation conditions to produce carbon dioxide and thereafter forcing the carbon dioxide through the formation by injecting a driving fluid.

SUMMARY

The present invention relates to a method for the recovery of oil from a subterranean, permeable, viscous oil-containing formation penetrated by at least one injection well and at least one spaced-apart production well, said wells being in fluid communication with a substantial portion of the formation, comprising injecting a predetermined amount of steam into the formation via said injection well, injecting a sufficient amount of a mixture of sodium bicarbonate and citric acid into the formation via said injection well that react in the formation to form a predetermined amount of carbon dioxide, injecting a driving fluid into the formation via said injection well to force said carbon dioxide through said formation to displace said oil, and recovering fluid including oil from said formation via said production well. In another embodiment of the invention, the carbon dioxide is formed in situ at a pressure whereby there is formed a miscible transition zone between the carbon dioxide and the formation oil at the temperature of the formation so that subsequent oil recovery is under miscible conditions. A soak period may be utilized between injection of steam and injection of the mixture of sodium bicarbonate and citric acid.

DESCRIPTION OF THE PREFERRED EMBODIMENTS

In carrying out the invention, a subterranean, oil-containing formation is penetrated by at least one injection well and at least one spaced-apart production well in fluid communication with a substantial portion of the formation. The injection and production wells are completed in a conventional manner, such as perforating the wells throughout the full or a substantial amount of the vertical thickness of the oil-containing formation. While recovery of the type contemplated by the present invention may be carried out by employing only two wells, it is to be understood that the invention is not limited to any particular number of wells. The invention may be practiced using a variety of well patterns as is well known in the art of oil recovery, such as an inverted five spot pattern in which an injection well is surrounded with four production wells, or in a line drive arrangement in which a series of aligned injection wells and a series of aligned production wells are utilized. Any number of wells which may be arranged according to any pattern may be applied in using the present method as illustrated in U.S. Pat. No. 3,927,716 to Burdyn et al, the disclosure of which is hereby incorporated by reference. Either naturally occurring or artificially induced fluid communication should exist between the injection well and the production well. Adequate fluid communication may be accomplished by fracturing procedures well known in the art.

In the first step of the invention, a predetermined amount of steam, ranging from 1.3 to 1.8 pore volumes, is injected into the formation via the injection well at an injection rate within the range of 1 to 1.5 barrels of steam (cold water equivalent) per day per acre-foot of formation. By the term "pore volume" as used herein, is meant that volume of the portion of the formation underlying the well pattern employed as described in greater detail in above-mentioned U.S. Pat. No. 3,927,716 to Burdyn et al. Steam temperature is within the range of 450° to 550° F. and a quality of 50% to 90%. The amount of steam injected will vary depending upon the thickness of the formation, oil saturation, viscosity of the oil, porosity of the formation, the amount of water in the formation, and the well pattern. After a predetermined amount of steam has been injected into the formation, it is usually preferred to shut in the injection well and allow the injected steam to condense thereby giving up its heat to the formation rock and fluids and permitting the heat to diffuse away from the injection well and into the formation. This results in the formation reaching a thermal equilibrium as far as heat distribution is concerned.

After a predetermined amount of steam has been injected, and a soak period, if one is used, a sufficient amount of a mixture of sodium bicarbonate and citric acid is injected into the formation via the injection well that reacts in the formation heated by previously injected steam to form a predetermined amount of carbon dioxide in situ, preferably in the range of 350 to 600 SCF of $CO_2$ per barrel of steam (cold water equivalent) previously injected, in accordance with the following equation:

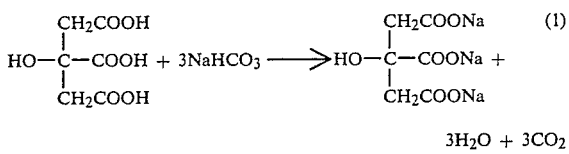

$$3H_2O + 3CO_2$$

The amount of sodium bicarbonate and citric acid injected into the formation to produce the desired amount of carbon dioxide is dictated by the stoichiometry of general reaction 1.

Once the desired amount of carbon dioxide has been established within the formation, a driving fluid, preferable hot water or low quality steam (less than 20%) is injected into the formation via the injection well to drive the carbon dioxide through the formation into contact with the oil which along with the carbon dioxide is displaced toward the production well from which fluids including oil are recovered. The driving fluid may, however, be any relatively inexpensive fluid, including gas such as air, nitrogen, combustion or flue gas, separator gas, natural gas, methane, or mixtures thereof. The drive fluid may also be water or brine and may contain additives such as a surfactant, to maintain efficient displacement by the driving fluid. Injection of the driving fluid is continued until either all of the oil has been displaced from the formation or until the produced fluids contain an unfavorable ratio of the driving fluid to formation oil.

The carbon dioxide formed in situ is highly soluble in formation fluids and is generally much more soluble in oil than in water. Due to its solubility in oil, when the carbon dioxide contacts the formation oil a portion of it goes into solution with the formation oil, resulting in a viscosity reduction and swelling of the oil thereby facilitating its displacement from the formation by the subsequent fluid drive. In addition to the viscosity reduction, there is a preferential extraction from the oil by the carbon dioxide of light intermediate hydrocarbons containing from 2 to 5 carbon atoms, thereby developing an intermediate-rich carbon dioxide bank in the vicinity of the line of contact between the formation oil and the carbon dioxide. Depending upon the composition of the formation fluids, and under proper conditions of formation pressure and temperature, the intermediate-rich carbon dioxide bank may be completely miscible with the formation oil thereby forming a miscible transition zone with the formation oil. Depending upon the formation temperature, there is a minimum pressure at which conditional miscibility exists between the carbon dioxide and formation oil which is known as the $CO_2$ minimum miscibility pressure (MMP). Conditional miscibility is to be distinguished from instant miscibility by the fact that miscibility in a conditional miscibility sense is achieved by a series of transition multiphase conditions described above wherein the carbon dioxide vaporizes intermediate components from the oil until it becomes miscible, thus creating the miscible transition zone in the formation. This minimum miscibility pressure can be determined by means of slim tube displacement tests which means conditions are established simulating those of an enriched gas drive, see paper by Yellig et al entitled, "Determination and Prediction of $CO_2$ Minimum Miscibility Pressure," *J. of Pet. Tech.*, Jan. 1980, pp. 160–168, the disclosure of which is incorporated by reference. Briefly, $CO_2$ MMP is determined by the slim tube test wherein percent oil recovery of the in-place fluid is determined at solvent breakthrough at given pressure conditions. By varying the pressure at constant composition and temperature, a break-point is determined in a curve of percent recovery versus pressure. This break-point is indicative of the inception of conditional miscible-type behavior.

If miscible displacement is desired in accordance with the present invention and the $CO_2$ MMP is above formation pressure at the temperature of the formation, a fluid may be injected into the formation prior to the injection of steam to repressure the formation to a pressure at least that at which conditional miscibility exists between carbon dioxide and formation oil. The repressurizing fluid may consist of air, nitrogen, combustion gas, natural gas, methane, water and mixtures thereof. Operating under conditions of miscible displacement enhances oil recovery due to substantially complete displacement of the formation oil.

The amount of carbon dioxide formed in situ should be an amount which provides a transition zone of flowing fluid from the formation oil to the displacing fluid. The approximate amount of carbon dioxide required may be determined by known procedures in laboratory-conducted floods under simulated formation conditions. The amount will, of course, be affected by formation conditions of temperature and pressure, together with the formation fluids' characteristics.

What is claimed is:

1. A method for the recovery of oil from a subterranean, permeable, viscous oil-containing formation penetrated by at least one injection well and at least one spaced-apart production well, said wells being in fluid communication with a substantial portion of the formation, comprising:

(a) injecting a predetermined amount of steam into the formation via said injection well;

(b) injecting a sufficient amount of a mixture of sodium bicarbonate and citric acid into the formation via said injection well that react in the formation to form a predetermined amount of carbon dioxide;

(c) injecting a driving fluid into the formation via said injection well to force said carbon dioxide through said formation to displace said oil; and (d) recovering fluid including oil from said formation via said production well.

2. The method of claim 1 wherein the amount of steam injected during step (a) is within the range of 1.3 to 1.8 pore volumes.

3. The method of claim 1 wherein the amount of carbon dioxide formed during step (b) is within the range of about 350 to 600 SCF of $CO_2$ per barrel of steam (cold water equivalent) injected during step (a).

4. The method of claim 1 wherein the steam is injected at an injection rate within the range of 1 to 1.5 barrels of steam (cold water equivalent) per day per acre-foot of formation and steam quality is within the range of 50 to 90%.

5. The method of claim 1 wherein the driving fluid is selected from the group consisting of air, nitrogen, combustion gas, separator gas, natural gas, methane, water, hot water, low quality steam (less than 20%) and mixtures thereof.

6. The method of claim 1 wherein the driving fluid is hot water.

7. The method of claim 1 further including shutting in the injection well and allowing the formation to undergo a soak period after step (a).

8. A method for the recovery of oil from a subterranean, permeable, viscous oil-containing formation penetrated by at least one injection well and at least one spaced-apart production well, said wells being in fluid communication with a substantial portion of the formation, comprising:
  (a) determining the minimum conditional miscibility pressure at the temperature of said formation at which carbon dioxide forms a miscible transition zone with said oil;
  (b) injecting a fluid into said formation to repressure said formation to a pressure at least that at which conditional miscibility exists at the temperature of said formation between said carbon dioxide and said oil;
  (c) injecting a predetermined amount of steam into the formation via said injection well at said pressure of step (b);
  (d) injecting a sufficient amount of a mixture of sodium bicarbonate and citric acid into the formation via said injection well at said pressure of step (b) that react in the formation to form a predetermined amount of carbon dioxide;
  (e) injecting a driving fluid into the formation via said injection well to force said carbon dioxide through said formation to displace said oil; and
  (f) recovering fluid including oil from said formation via said production well.

9. The method of claim 8 wherein the amount of steam injected during step (c) is within the range of 1.3 to 1.8 pore volumes.

10. The method of claim 8 wherein the amount of carbon dioxide formed during step (d) is within the range of about 350 to 600 SCF of $CO_2$ per barrel of steam (cold water equivalent) injected during step (c).

11. The method of claim 8 wherein the steam is injected at an injection rate within the range of 1 to 1.5 barrels of steam (cold water equivalent) per day per acre-foot of formation and steam quality is within the range of 50 to 90%.

12. The method of claim 8 wherein the driving fluid injected during step (e) is selected from the group consisting of air, nitrogen, combustion gas, separator gas, natural gas, methane, water, hot water, low quality steam (less than 20%) and mixtures thereof.

13. The method of claim 8 wherein the driving fluid injecting during step (e) is hot water.

14. The method of claim 8 wherein said repressuring fluid is selected from the group consisting of air, nitrogen, combustion gas, natural gas, methane, water and mixtures thereof.

15. The method of claim 8 further including shutting in the injection well and allowing the formation to undergo a soak period after step (c).

* * * * *